United States Patent
Paudel et al.

(10) Patent No.: US 12,034,490 B2
(45) Date of Patent: Jul. 9, 2024

(54) RECONFIGURABLE QUANTUM KEY DISTRIBUTION (QKD) HARDWARE

(71) Applicant: The Aerospace Corporation, El Segundo, CA (US)

(72) Inventors: Uttam Paudel, La Palma, CA (US); Noel De La Cruz, Compton, CA (US); Andrew K. Mollner, Los Angeles, CA (US); Alexander Christidis, Whittier, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 81 days.

(21) Appl. No.: 17/537,962

(22) Filed: Nov. 30, 2021

(65) Prior Publication Data

US 2023/0171003 A1   Jun. 1, 2023

(51) Int. Cl.
*H04B 10/85* (2013.01)
*G06N 10/60* (2022.01)
*H04B 10/40* (2013.01)
*H04L 9/08* (2006.01)

(52) U.S. Cl.
CPC ............ *H04B 10/85* (2013.01); *G06N 10/60* (2022.01); *H04B 10/40* (2013.01); *H04L 9/0852* (2013.01)

(58) Field of Classification Search
CPC ........ H04B 10/85; H04B 10/40; H04L 9/0852
See application file for complete search history.

(56) References Cited

U.S. PATENT DOCUMENTS

| | | | |
|---|---|---|---|
| 3,813,553 A * | 5/1974 | Grossman | H04B 10/1125 250/347 |
| 7,831,049 B1 | 11/2010 | Kanter | |
| 8,116,636 B2 | 2/2012 | Youn et al. | |
| 2004/0042798 A1 * | 3/2004 | Kehr | H04B 10/43 398/129 |
| 2008/0044187 A1 * | 2/2008 | Krill | H04B 7/18508 398/121 |
| 2012/0230493 A1 * | 9/2012 | Bowes | H04L 9/0858 380/278 |
| 2014/0294399 A1 * | 10/2014 | Makowski | H04B 10/118 398/126 |
| 2021/0091854 A1 * | 3/2021 | Uyeno | G02B 6/3512 |

FOREIGN PATENT DOCUMENTS

GB   2604663 A *  9/2022 ........... H04L 9/0855

* cited by examiner

*Primary Examiner* — Pranesh K Barua
(74) *Attorney, Agent, or Firm* — LeonardPatel PC

(57) ABSTRACT

A reconfigurable QKD transceiver capable of transmitting and/or receiving qubits using a single optical hardware platform. This reconfigurable QKD transceiver enables various link scenarios specially for LEO-ground network, where the satellites have limited engagement time with a ground station. The reconfigurable QKD transceiver may reduce the optics SWaP by 50 percent and may allow for new mission scenarios that were otherwise not feasible with a transmitter only architecture or receiver only architecture.

15 Claims, 7 Drawing Sheets

100

US 12,034,490 B2

RECONFIGURABLE QUANTUM KEY DISTRIBUTION (QKD) HARDWARE

STATEMENT OF GOVERNMENT INTEREST

This invention was made with government support under Contract No. FA8802-19-C-0001 awarded by the Department of the Air Force. The government has certain rights in the invention.

FIELD

The present invention relates to transmission and receiving of encrypted data using QKD techniques.

BACKGROUND

QKD exploits quantum mechanical properties of photons to generate a shared but "unlimited" supply of key between two remote parties. For example, typically with QKD, there is a dedicated transmitter on a first side (e.g., Alice) and a dedicated receiver on a second side (e.g., Bob). See, for example, FIG. 1, which is a diagram illustrating a classical communication system. In this example, photons or qubits flow from Alice (Tx) to Bob (Rx) to generate a cryptographic key via an encryptor.

QKD requires knowledge of the first side (e.g., Alice) and the second side (e.g., Bob) is the system architecture. These sides are essentially fixed for all time, because the hardware associated with the first side and the hardware associated with the second side are different. For this reason, there must be two complete systems on a spacecraft, which is problematic from a size, weight and power perspective, or there must be a very rigid space architecture, where the function that the hardware is performing remains constant, i.e., the first side stays the same.

Accordingly, a single reconfigurable QKD transceiver, which switches between being a first side (e.g., Alice) and second side (e.g., Bob), would be beneficial.

SUMMARY

Certain embodiments of the present invention may provide solutions to the problems and needs in the art that have not yet been fully identified, appreciated, or solved by current QKD technologies. For example, some embodiments of the present invention pertain to a reconfigurable QKD transceiver capable of transmitting and/or receiving qubits using a single optical hardware platform. This reconfigurable QKD transceiver enables various link scenarios specially for LEO-ground network, where the satellites have limited engagement time (e.g., 10-15 minutes) with a ground station. The reconfigurable QKD transceiver may reduce the optics SWaP by 50 percent and may allow for new mission scenarios that were otherwise not feasible with a transmitter only architecture or receiver only architecture.

In an embodiment, a reconfigurable QKD transceiver includes a plurality of co-located transmitters and photon detectors, each of which operate on a corresponding transmit and receive optical path. The QKD transceiver includes a mechanism for beam displacement. The mechanism is configured to shift a beam position between a transmit and receive optical path.

In another embodiment, a system for transmitting and receiving encrypted data using QKD includes a plurality of QKD transceivers each of which receive and transmit the encrypted data from a first ground station to a second ground station. Each of the plurality of QKD transceivers are configured to switch between a receiving mode for receiving the encrypted data and a transmitting mode for transmitting the encrypted data. Each of the plurality of QKD transceivers includes a beam displacement mechanism configured to switch between the receiving mode and the transmitting mode.

In yet another embodiment, a method for exchanging a secure cryptographic key between a first satellite and a second satellite includes changing, by the first satellite, a mode of operation from the receiving mode to a transmit mode and randomly generates a sequence of qubits for transmission. The method includes randomly selecting, by the first satellite, a basis to encode a plurality of qubits. The method further includes transmitting, by the first satellite, the plurality of encoded qubits to the second satellite. The method also includes communicating, from the first satellite, to the second satellite regarding which basis set was used. The method further includes disregarding, by the first satellite, one or more qubits that used a different basis set from that of the second satellite.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments generally pertain to a reconfigurable QKD transceiver capable of transmitting and/or receiving qubits using a single optical hardware platform.

Figure 1:
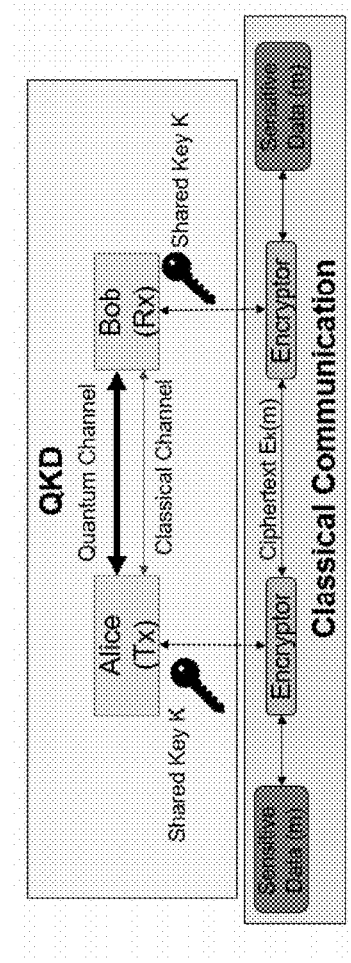
FIG. 1 is a diagram illustrating a conventional (or classical) communication system, according to an embodiment of the present invention.
Figure 2:
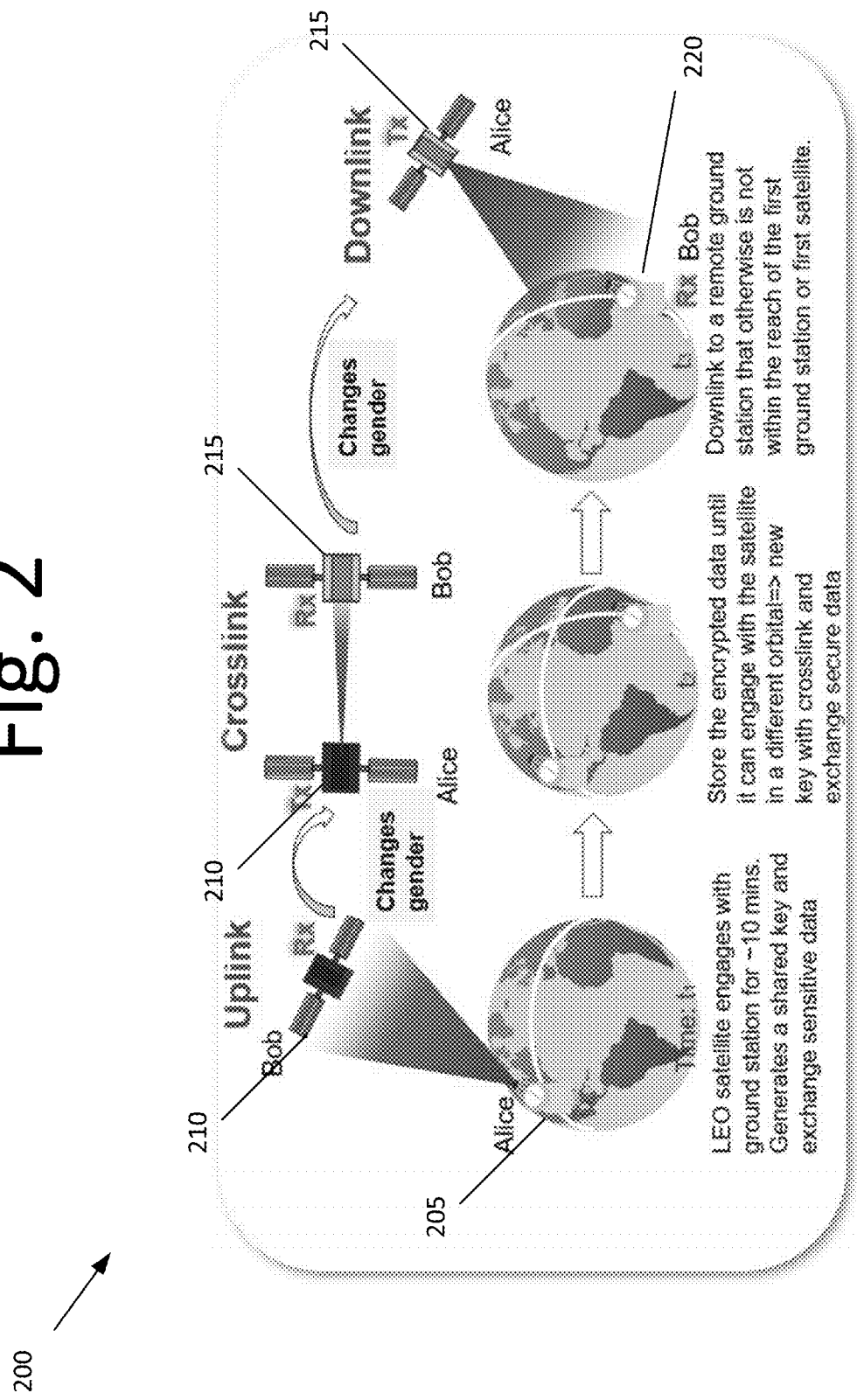
FIG. 2 is a diagram illustrating a global network for transmitting data between two distant ground stations not accessible by a single payload, according to an embodiment of the present invention.

FIG. 2 is a diagram illustrating a global network 200 for transmitting data between two distant ground stations not accessible by a single payload, according to an embodiment of the present invention. For example, in embodiments where there is a global network 200, the needs for the hardware, depending on the direction of transmission, may change. In the example shown in FIG. 2, when the uplink is from ground, ground station 205 may be configured as Alice because ground station 205 has a large aperture transmitter with good pointing to link with a first satellite 210 (e.g., Bob). First satellite 210 may engage with ground station 205 for approximately 10 minutes, and may generate a shared key exchanging sensitive data. Sensitive data for purposes of explanation may be any digital information encoded for RF or optical communication or any data that the user would like to protect.

Now let us assume that first satellite 210 needs to cross-link with a second satellite 215, the transceiver component of first satellite 210 may switch gender or functionality, i.e., switch from receiver mode (e.g., Bob) to transmitter mode (e.g., Alice). In other words, first satellite 210 switches the function of its transceiver on the fly. With this switching on first satellite 210, the amount of hardware required on the satellite is reduced by at least 50 percent. The reduction in hardware has benefits. For example, this reduction in hardware, reduces the mass of the satellite, effectively reducing the overall cost of developing the satellite and reducing the cost of launching the satellite.

First satellite 210, after changing gender or before changing gender, may store the encrypted data until engaged with second satellite 215, which may be in a different orbital pattern. In this instance, first satellite 210 is configured as Alice and second satellite 215 is configured as Bob, allowing first satellite 210 to share a new key with crosslink and exchange the sensitive data.

For purposes of explanation, with respect to QKD, keys are generated between the two parties that currently have an optical link. These keys are only generated, in this example, between Alice and Bob as currently configured and only used by that pair for their communications. Each time the identities of Alice or Bob are changed, a new key (or set of keys) are generated.

Continuing with this example, since the final destination is ground station 220, second satellite 215 may now switch genders again, i.e., change from Bob to Alice. This change allows a downlink from second satellite 215 to ground station 220.

Figure 3:
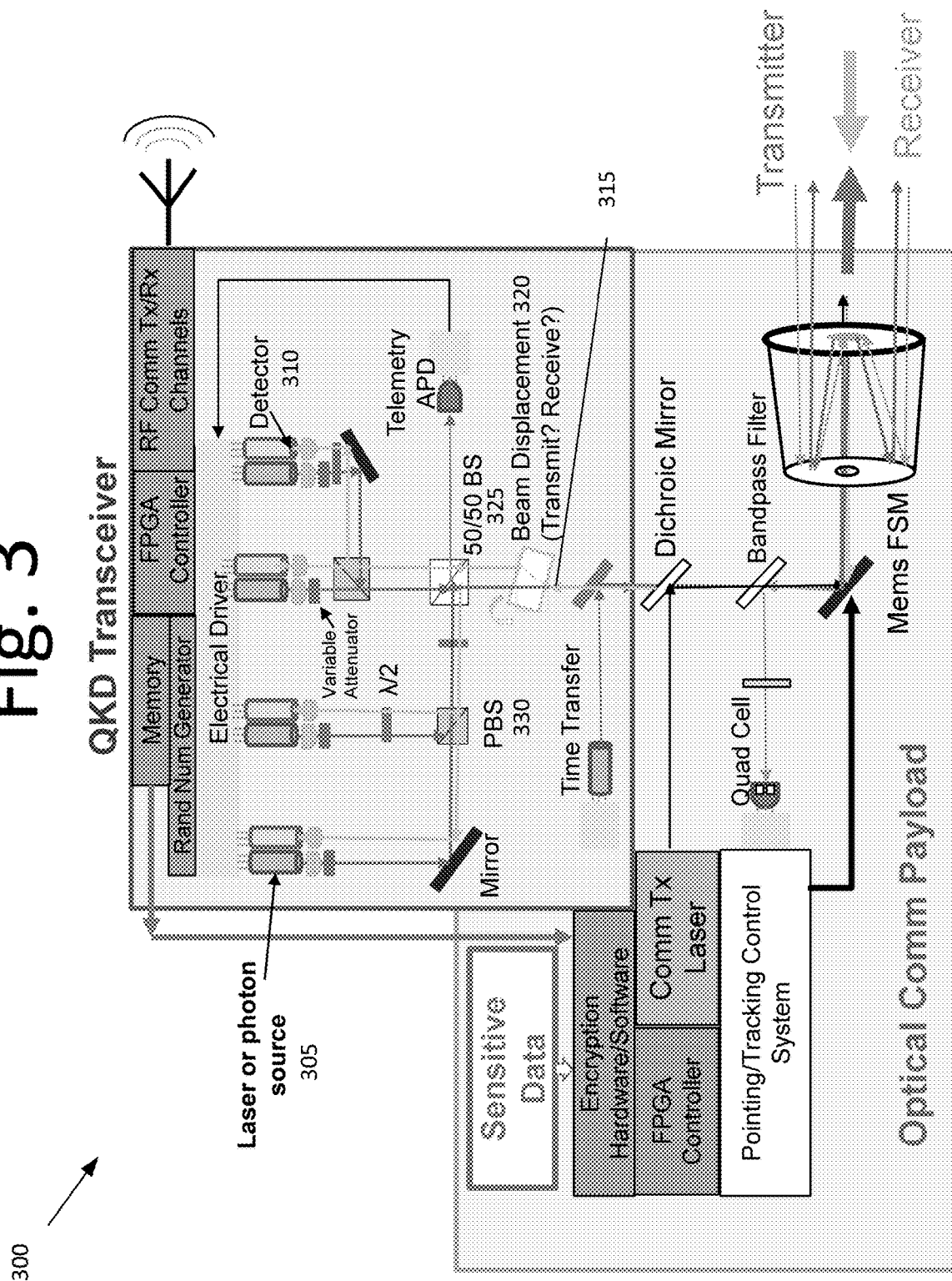
FIG. 3 is a diagram illustrating a QKD transceiver integrated with optical and radio frequency (RF) communication, according to an embodiment of the present invention.

FIG. 3 is a diagram illustrating a QKD transceiver 300 integrated with optical and RF communication, according to an embodiment of the present invention. In some embodiments, QKD transceiver 300 includes a plurality of laser sources 305, which are capable of generating qubits. Next to each laser source 305 is a single photon laser detector 310 capable of detecting an incoming photons or qubits. Due to the proximity of laser sources 305, photon laser detectors 310 and optics, there may be ~5 mm lateral displacement of Rx beam at detector plane to avoid interfering with a transmit path.

An optical path 315, which combines outputs from laser sources 305 into a single optical path, when QKD transceiver 300 is in a transmit mode (e.g., Alice). However, when QKD transceiver 300 is in a receive mode (e.g., Bob), optical path 315 splits all incoming photons into four distinct channels. Each channel may be set to a different polarization state of the light. Essentially, these are four different qubits, each of which is holding information that is to be received.

In other words, in one direction the qubits are being combined in one path, and in the other direction, the photons being received on that path are being split into four separate paths.

In some embodiments, there is a beam displacement element 320 that selects the mode of operation—transceiver (i.e., Alice) or receiver (i.e., Bob)—by displacing the beam path slightly. In other words, beam displacement element 320 may be moved from a first position (e.g., position A) to a second position (e.g., position B) and vice versa.

Slightly for purposes of this embodiment may be defined as the transmit and receive beam paths being separated by 5 mm at the receive/laser. This separation can be achieved by a moveable wedge having a thickness of 11.25 mm and material N-SF14. In other embodiments having a different design with different displacement, a different displacement wedge or other displacement mechanism, such as a movable mirror or optical switch, may be required.

Photons may be polarized in different linearization states. For example, if a photon is polarized vertically, a qubit is assigned a value of 1. If, however, the photon is polarized horizontally, the qubit is assigned a value of 0. The polarization may be further rotated 45 degrees to a diagonal polarization from a horizontal polarization, such that the qubit has a value of 1, and an anti-diagonal polarization from the vertical polarization provides a value of 0 to the qubit. These pairs of polarizations, vertical/horizontal (H/V) or diagonal/antidiagonal (D/A) are referred to as the two basis sets for qubit transmission. Because there may be four different linearization states, it is important to have the four channels.

These four channels allow for randomly selected basis sets. For example, if there is a bit sequence that is to be transmitted, a basis set is randomly selected, and based on the randomly selected basis set, the qubits are encoded. In some embodiments, the randomly selected basis set include a horizontal and vertical set or a diagonal and anti-diagonal set. Similarly, the receiver side (i.e., Bob) also randomly selects the basis set to be measured. It should be noted that for every single qubit transmission and detection, Alice and Bob randomly decide between H/V or D/AD.

By randomly selecting the basis set (or selecting the qubits), an intruding device cannot guess which basis it was sent on, thereby making it difficult to steal the data. For example, each time a photonic qubit is transmitted from Alice to Bob, both endpoints randomly select a basis set. If Alice and Bob select different basis sets for a qubit, there will be a large number of errors when Bob and Alice respectively compare bit values (e.g., roughly 50%). If, however, Bob and Alice select the same basis set, the error rate should be low. In some embodiments, the error rate may be below approximately 15 percent, and in some additional embodiments, may be as low as less than 5 percent.

This process is the key to the security of QKD protocols. For example, if an eavesdropper (or an intruding device) is intercepting qubits and re-transmitting them between Alice and Bob, errors would be introduced in the process because the intruding device would not know ahead of time which basis sets Alice used for transmission. By comparing the bit error rates for a subset of the transmitted qubits, Alice and Bob can now verify that an intruding device was not present during transmission.

FIG. 3 shows a possible embodiment, where the random selection of each basis set is accomplished via a 50/50 beam splitter (BS) 325. In receive mode, polarizing BS (PBS) 330 measures the polarization state of the detected photon in the randomly selected basis set, resulting in a measured qubit value of 0 or 1 for a single QKD exchange. Similarly, in transmit mode, BS 325 combines the four different channels to transmit a single polarization state of a randomly chosen basis set, resulting in a transmitted qubit value of 0 or 1 for that exchange. The measurement may then proceed to method 700 of FIG. 7.

Figure 4:
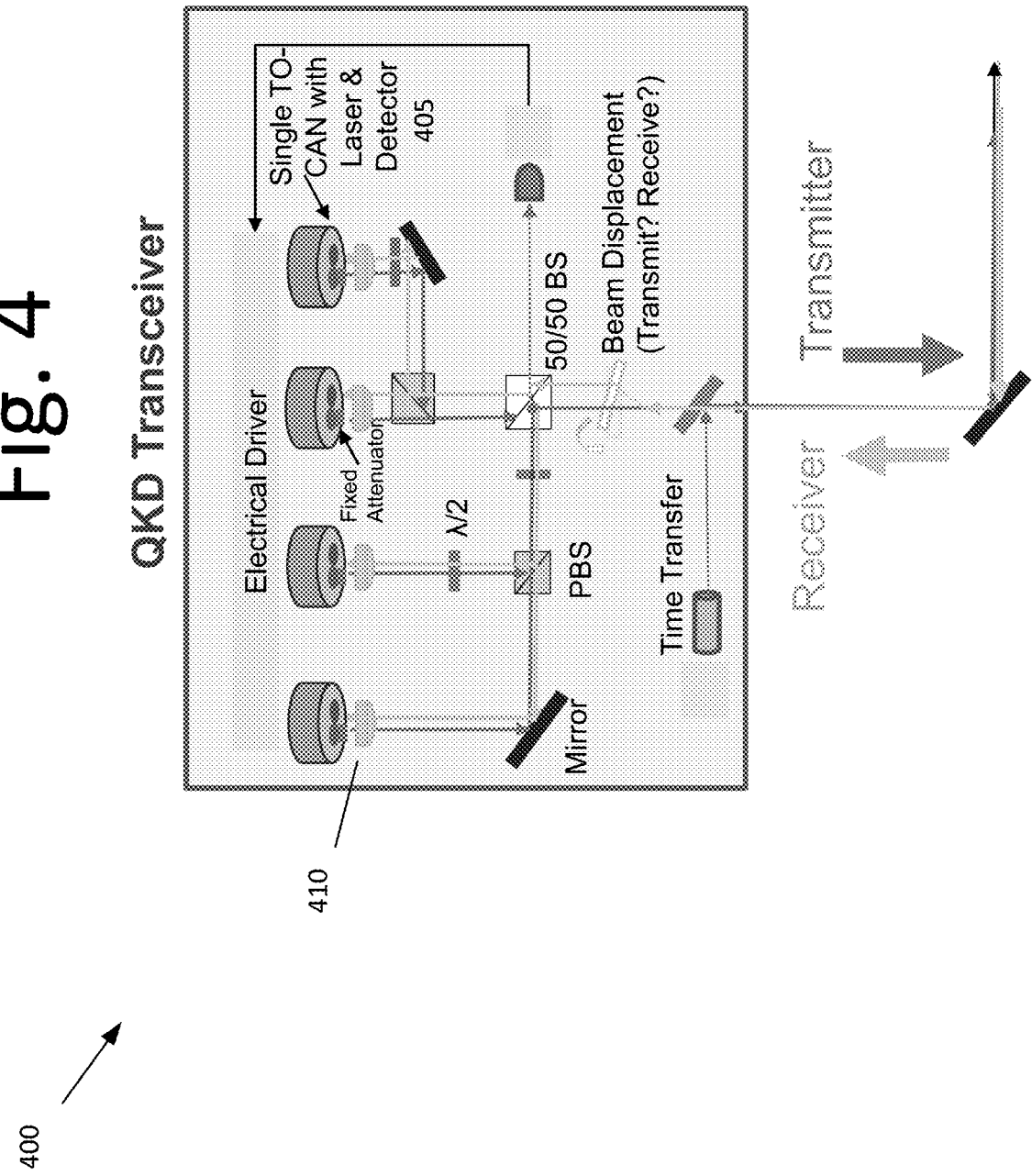
FIG. 4 is a diagram illustrating a QKD transceiver integrated with a single packaged laser and detector, according to an embodiment of the present invention.

FIG. 4 is a diagram illustrating a QKD transceiver 400 integrated with a single packaged laser and detector, according to an embodiment of the present invention. In some embodiments, an integrated laser and detector is combined into a single packaged mount 405, such as a TO CAN or other compact and/or hermetically sealed package. TO CAN is a form of a metal can that holds lasers and/or detectors. TO CAN may be any other housing that holds a laser diode, single photon source. The packaged mount 405 is a cylindrical cannister that includes both the laser transmitter and detector.

In this embodiment, with the laser and detector integrated to a single package, it may be sufficient to have ~100 μm displacement between Rx and Tx beams=>2 mm thick fused silicon (Si) at 9° incident angle.

In front of TO CAN mount 405 is a mirror 410. Mirror 410 is a lens that collects or collimates light from the laser.

Figure 6:
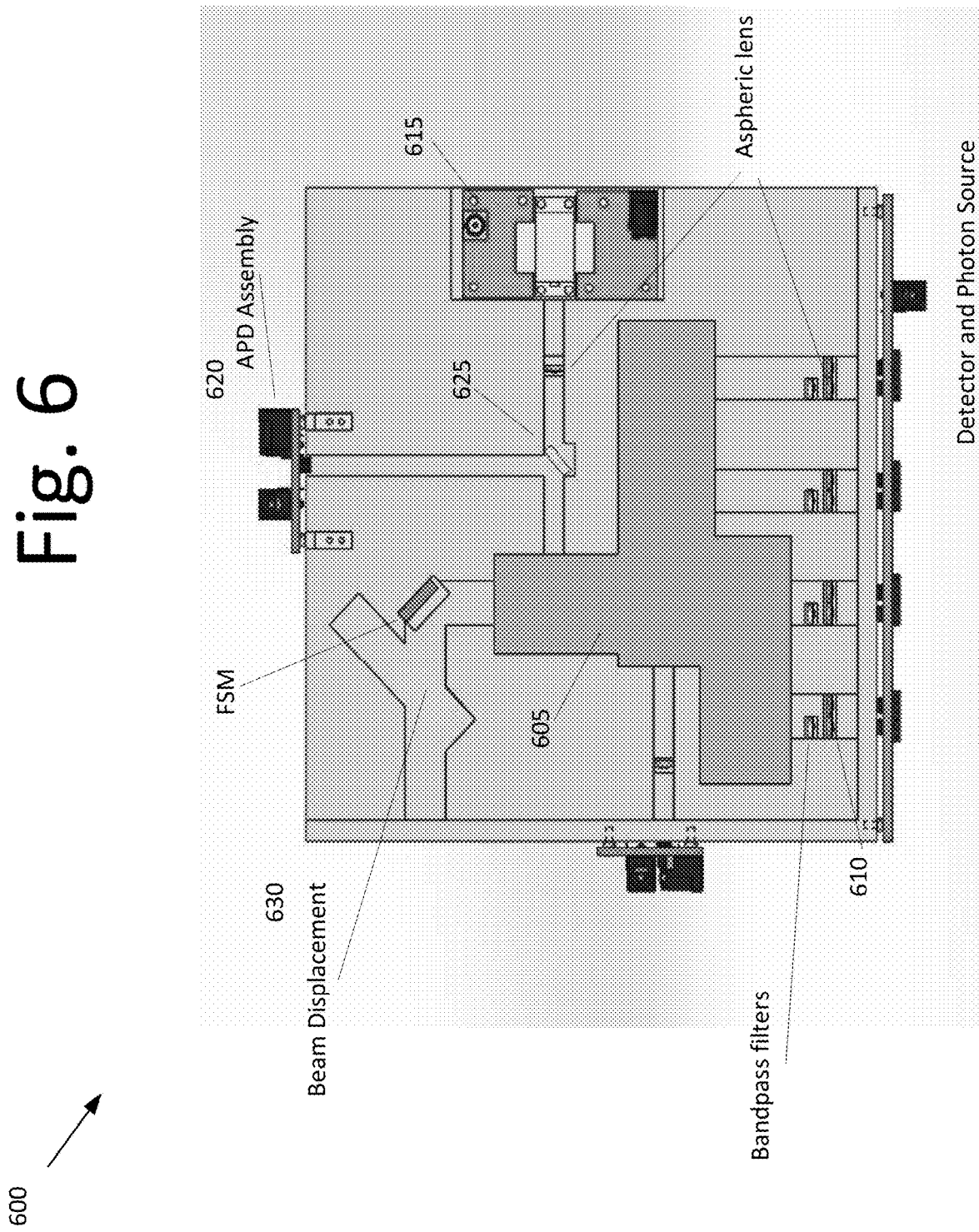
FIG. 6 is a diagram illustrating a single packaged laser and detector, according to an embodiment of the present invention.

It should be noted that the purpose of the displacement optics is to route the transmission Tx light through the same telescope that collects receiving Rx photons. The exact displacement is directly proportional to the separation between the transmission Tx and receiving Rx active area. As shown in FIG. 6, for example, the transmit and receive beam paths are separated by 5 mm at the receiver/laser. This separation can be achieved by a movable wedge having a thickness of 11.25 mm and material N-SF14. A design with different displacement may require a different thickness displacement wedge (with a roughly linear scaling) or some other displacement mechanism such as a movable mirror or optical switch.

Returning to FIG. 4, both lasers and detectors are on the same chip. This forces the attenuator to go in front of the laser, but not in front of the received detector. In some embodiments, the two elements are separated by ~100 um, which allow one to use the same optical element including the focusing lens and will require much smaller displacement.

Figure 5:
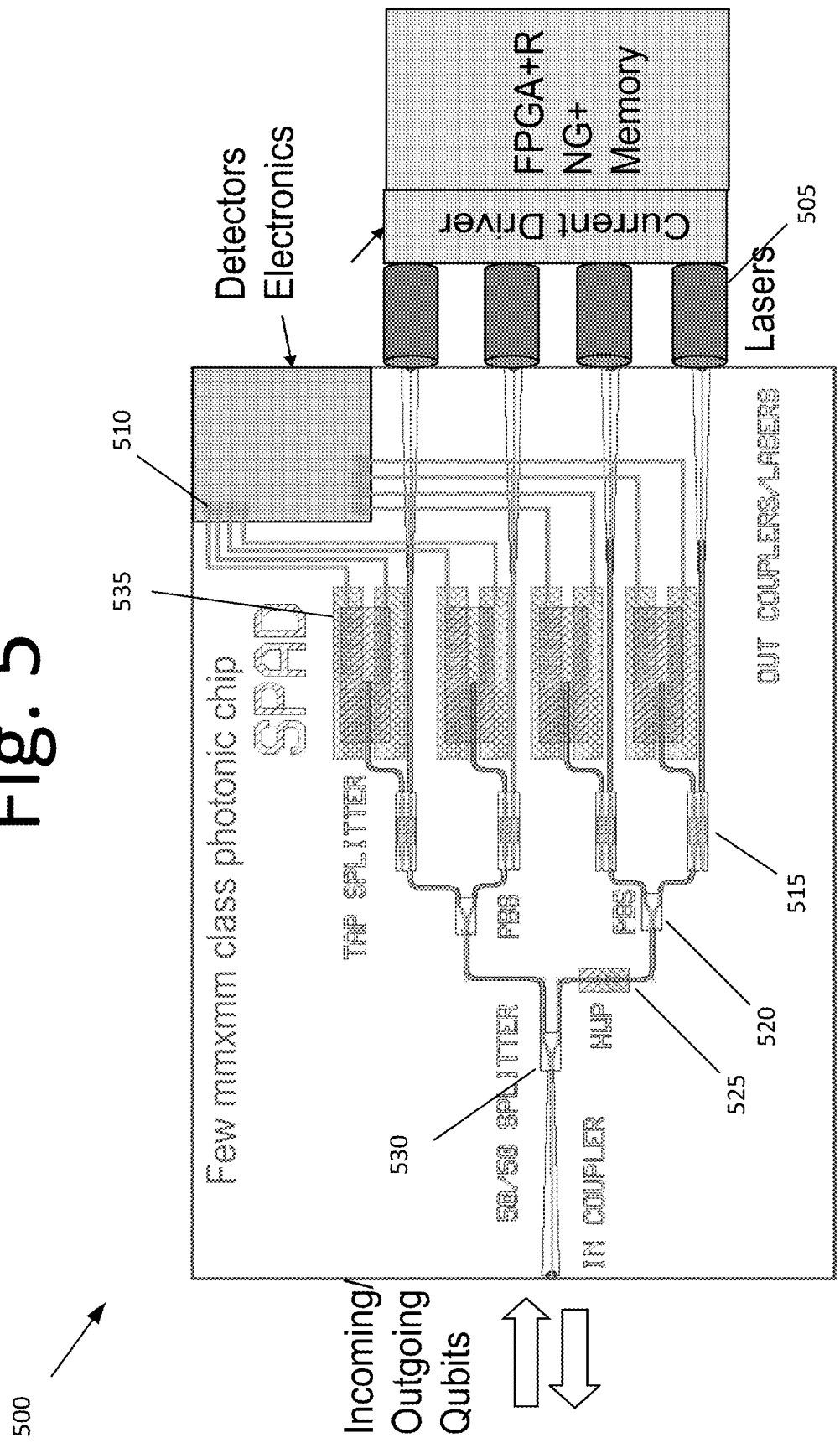
FIG. 5 is a diagram illustrating a modulator free chip-scale integrated QKD transceiver, according to an embodiment of the present invention.

FIG. 5 is a diagram illustrating a modulator free chip-scale integrated QKD transceiver 500, according to an embodiment of the present invention. In some embodiment, QKD transceiver 500 uses photonic integrated circuits to perform beam splitting and polarization selection.

In some embodiments, laser sources 505 may be off chip diode lasers coupled through micro optics. In some other embodiments, laser sources 505 may be flip-chip bonded on silicon or other integrated photonics platform such as Lithium Niobate InP. Detectors 510 may also be on-chip single photon detectors such as Germanium or integrated superconducting nanowire detectors. In some other embodiments, detectors 510 may be flip-chip bonded with external detectors.

Lasers produced by laser sources 505 are combined using a pair of photonic integrated polarization beam splitter/combiner (PBS) 520. It should be noted that in some embodiments one combined arm is rotated by 45 degrees using polarization rotator 525 to generate photons of diagonal polarization or anti-diagonal polarization, the pair of which forms the diagonal/anti-diagonal (D/A) basis set for qubit transmission. The other two lasers serve to generate photons of horizontal or vertical polarization, the pair of which form the vertical/horizontal (H/V) basis set for qubit transmission. All 4 channels are then combined by a single 1×2 polarization agnostic combiner (or 50/50 splitter) 530.

A tap splitter 515 is a highly asymmetric power splitter, such that only a small fraction for the laser photon is transmitted to combiner 530. Here, the small fraction can be between 0.001% and 1%. In no event, however, is the majority of the received light allowed to be funneled into single-photon detectors (SPADs) 535. SPADs 535 are configured to allow the majority of the light (e.g., >99%) to go on-chip single photon detectors 510 in order for the system to operate as a receiver with a very low (e.g., <1%) loss.

It should be appreciated that splitters 515, 520, and 530 are bidirectional, i.e., 99% of the photons from the laser gets lost at this interface (tap coupler) and only 1% transmitter. This, however, is not an issue, since the average photon number of the individual laser are set by monitoring the photon emission probability at the end of the chip Tx. The output of the chip may be coupled to a fiber or a lens, and then to a telescope. Depending on the embodiment, this device may have a single telescope and may not require a beam displacement mechanism.

This embodiment is useful for space application due to the size of QKD transceiver 500. In some embodiments, the optical beam combining and splitting mechanism itself may be less than 1 cm by 1 cm.

FIG. 6 is a diagram illustrating a single packaged laser and detector 600, according to an embodiment of the present invention. In some embodiments, the beam combining, such as in transmit mode, and/or beam splitting, such as in receive mode, may be accomplished with the use of a single beam-routing optic 605. Optic 605 contains surfaces with polarizing coatings generating the four polarization states and a surface with a 50/50 beam-splitting coating that randomly selects the basis set for a qubit exchange. Thus, the optics for generating qubits and combining/splitting outgoing/incoming photons can be packaged and mounted as a single piece. This is useful for reducing the amount of separately mounted optical components that would otherwise be necessary to generate the qubits, and also reduces the instances where correction for horizontal beam displacement due to refraction through separate optics is necessary.

In some embodiments, the output from laser sources 610 can be combined with a time-transfer signal 615, which is folded into the outgoing data stream. Similarly, when in receive mode, time-transfer data can be split from the incoming light at the surface of the beam-routing optic 605 and routed to an APD assembly 620 to provide timing data on the qubits.

In some embodiments, the desired detection or transmission of time-transfer data can be accomplished by alternately engaging and disengaging a flip mirror 625 depending on the current gender of the transceiver. As in the example shown in FIG. 6, the required incoming versus outgoing beam displacement is dependent on the distance between laser sources and detectors as well as the size of the optical surfaces within the beam-routing optic. In this example, the required beam displacement is achieved with the use of an optical wedge 630 moved in and out of the beam path, depending on the current gender of the transceiver.

Figure 7:
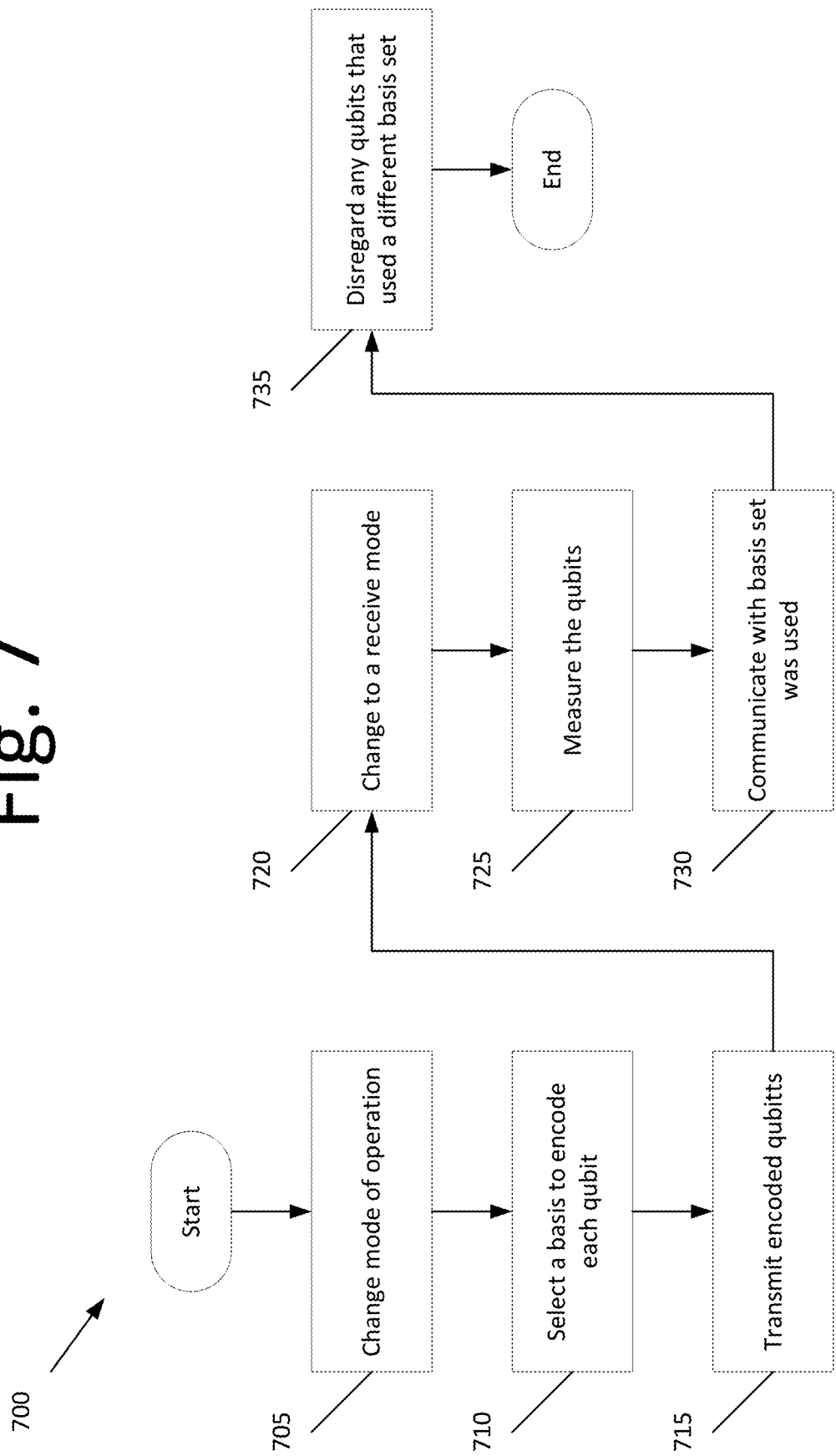
FIG. 7 is a diagram illustrating a flow diagram for exchanging keys between a transmitter and a receiver, according to an embodiment of the present invention.

FIG. 7 is a diagram illustrating a flow diagram 700 for exchanging keys between a transmitter and a receiver, according to an embodiment of the present invention. In some embodiments, information is encoded in the polarization state of individual photons. A key is generated, as a sequence of qubits in 1s and 0s.

At 705, Alice changes to a transmit mode and randomly generates a sequence of qubits for transmission. At 710, Alice randomly selects a basis to encode each of the qubits.

Also, in this embodiment, Alice maintains a list of which bits have been encoded, i.e., keeps track of the qubits.

At 715, Alice transmits the encoded bits to Bob, and at 720, Bob changes to a receive mode prior to randomly selecting a basis set for measuring the received photons (i.e., the qubits). At 725, Bob measures the qubit for 0 and 1. At 730, Alice and Bob communicate with each other regarding which basis set was used. In response, 735, Alice disregards any qubits that used a different basis set from that of Bob, and similarly, Bob disregards any qubits that used a different basis set from that of Alice. This allows Alice and Bob to exchange a secure cryptographic key.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A quantum key distribution (QKD) transceiver, comprising:
   a plurality of transmitters and a plurality of photon detectors, each of which are co-located and operate on a single transmit and receive optical path; and
   a mechanism for beam displacement, wherein the mechanism is configured to shift a beam position by moving from a transmit position to a receive position or from the receive position to the transmit position, switching the QKD transceiver between a transmit mode and a receive mode, wherein
   the movement of the mechanism from the transmit position to the receive position splits a received signal on a single transmit and receive optical path to a plurality of photon detectors, and the movement of the mechanism from the receive position to the transmit position combines a transmit signal generated by each of the plurality of transmitters onto the single transmit and receive optical path.

2. The QKD transceiver of claim 1, further comprising:
   a plurality of outputs from each of the plurality of transmitters are combined in the single transmit and receive optical path during the transmit mode; and
   the single transmit and receive optical path is configured to split incoming photons into a plurality of channels during the receive mode, directing the incoming photons to each of the plurality of photon detectors.

3. The QKD transceiver of claim 1, wherein each of the plurality of transmitters are configured to generate a signal comprising qubits.

4. The QKD transceiver of claim 3, further comprising:
   a beam splitter, in the transmit mode, configured to combine the signal from each of the plurality of transmitters into a single signal to be transmitted to another QKD transceiver.

5. The QKD transceiver of claim 4, wherein the beam splitter, in the receive mode, is configured to split a received signal from the other QKD transceiver into separate signals, one for each of the plurality of photon detectors.

6. The QKD transceiver of claim 5, further comprising:
   a polarizing beam splitter in front of one of the plurality of co-located transmitters and photon detectors, the polarizing beam splitter being configured to measure 0s and 1s in a randomly selected basis set of the received signal.

7. The QKD transceiver of claim 1, wherein the mechanism is configured to select a mode of operation between transmit mode and receive mode, the selection of the mode of operation is switched by displacing a beam path.

8. A system for transmitting and receiving encoded data using quantum key distribution (QKD), comprising:
   a plurality of QKD transceivers each of which receive and transmit the encoded data from a first ground station to a second ground station, wherein
   each of the plurality of QKD transceivers are configured to switch between a receiving mode for receiving the encoded data and a transmitting mode for transmitting the encoded data, each of the plurality of QKD transceivers comprising a beam displacement mechanism configured to switch between the receiving mode and the transmitting mode by moving from a transmit position to a receive position or from the receive position to the transmit position, and the encoded data comprises qubits.

9. The system of claim 8, wherein the beam displacement mechanism is configured to move from a first position to a second position and from the second position to the first position to switch between the receiving mode and the transmitting mode.

10. The system of claim 8, wherein each of the plurality of QKD transceivers comprise a plurality of laser sources co-located next to a plurality of detectors, each of the plurality of laser sources being configured to generate a transmission signal comprising the qubits encoding information to be received by another one of the plurality of QKD transceivers, and each of the plurality of detectors being configured to receive another transmission signal from one of the other plurality of QKD transceivers as an incoming signal comprising qubits.

11. The system of claim 10, further comprising:

a series of beam splitters/combiners configured to combine signal from each of the plurality of laser sources to produce a single signal.

12. The system of claim 11, wherein the series of beam splitters/combiners are configured to split the incoming signal into a plurality of signals to be detected by a corresponding one of the plurality of detectors.

13. The system of claim 11, further comprising:

a rotator next to one of the plurality of beam splitters/combiners, configured to generate a diagonal basis or an anti-diagonal basis for forming a diagonal basis set or an anti-diagonal basis set for qubit transmission.

14. The system of claim 11, further comprising:

a plurality single-photon detectors (SPADs) configured to allow a majority of the light to pass through to the plurality of detectors in order for the system to operate as a receiver with a very low loss.

15. The system of claim 8, further comprising:

an optical beam-routing optic configured to reduce an amount of separately mounted optical components and correct horizontal beam displacement due to refractions through separate optics.

* * * * *